March 6, 1934.  M. SHOELD  1,949,730
APPARATUS FOR THE MANUFACTURE OF A REFRIGERANT
Filed Aug. 28, 1929
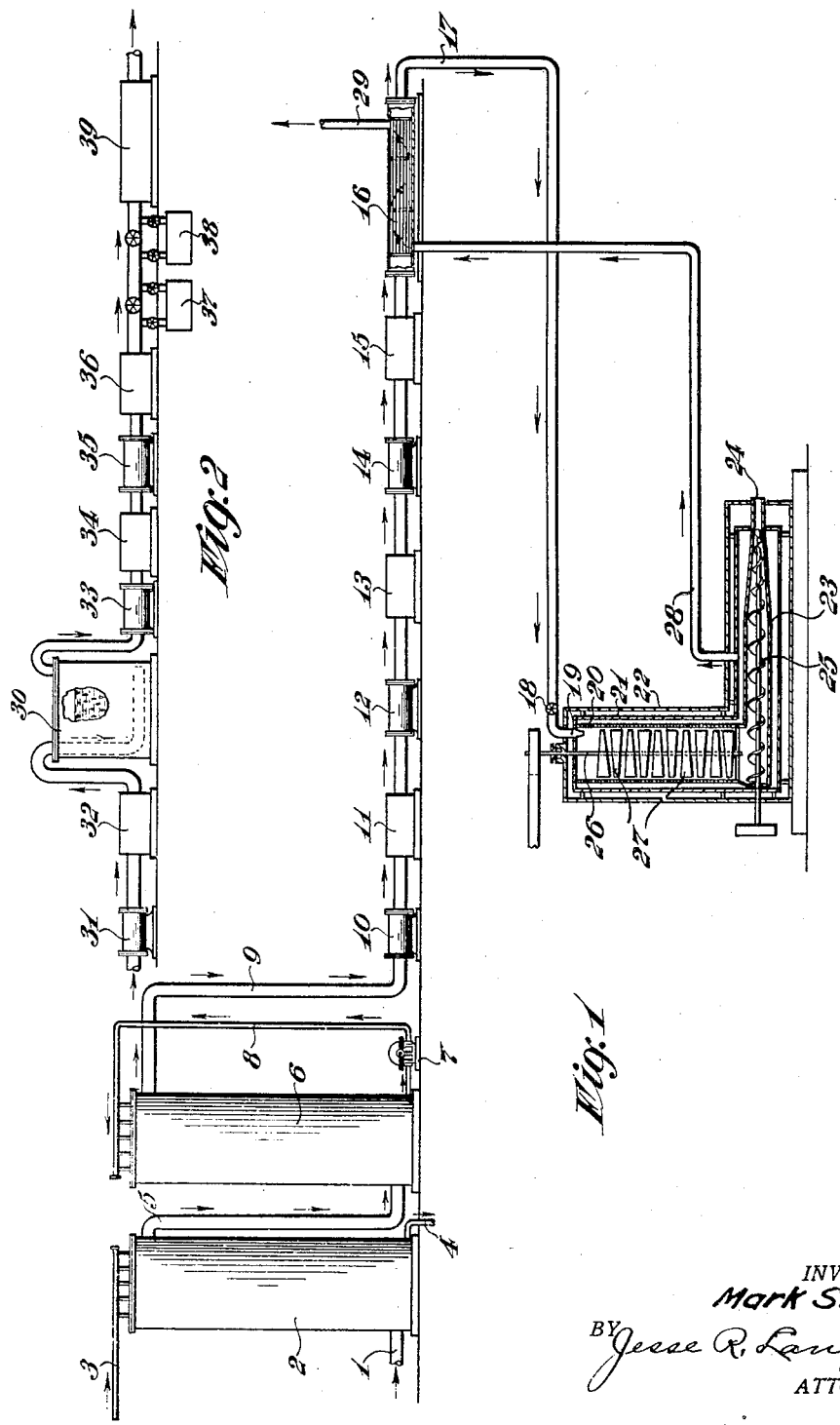
INVENTOR.
Mark Shoeld.
BY Jesse R. Langley
ATTORNEY.

Patented Mar. 6, 1934

1,949,730

UNITED STATES PATENT OFFICE 1,949,730

APPARATUS FOR THE MANUFACTURE OF A REFRIGERANT

Mark Shoeld, Mount Lebanon Township, Allegheny County, Pa., assignor to The Koppers Company of Delaware, a corporation of Delaware Application August 28, 1929, Serial No. 388,933

1 Claim. (Cl. 62—121)

This invention relates to an improved process of and apparatus for preparing solid carbon dioxide.

Ordinarily, carbon dioxide used for the preparation of dry ice, is produced by burning coke, and the flue gases are treated with a sodium carbonate solution which absorbs the carbon dioxide and is converted into sodium bicarbonate. The bicarbonate solution is boiled and pure carbon dioxide gas is liberated. This carbon dioxide gas is compressed and liquefied. The liquid is allowed to expand through a nozzle to atmospheric pressure. During this expansion approximately 40% of the total carbon dioxide is precipitated as snow, the remaining carbon dioxide gas must be recompressed and liquefied before it can be entirely converted into snow.

An object of the present invention is to provide a method of and apparatus for producing solid carbon dioxide directly from gases containing carbon dioxide. It has been found unnecessary either to treat the gases chemically or to liquefy the carbon dioxide in order to separate out pure carbon dioxide before it is expanded to produce the snow.

In accordance with the process of this invention a diluted carbon dioxide gas may be compressed to a relatively high pressure and then allowed to expand to or to about atmospheric pressure. Depending upon the pressure used, a part or all of the carbon dioxide is precipitated as snow.

For the purpose of reducing production costs, flue gases or waste gases containing carbon dioxide may be used. Blast furnace stove gas containing approximately 25% carbon dioxide and 75% nitrogen is particularly suitable.

The process of this invention may be carried out in the manner to be described in connection with the apparatus shown in the accompanying drawing in which:

Figure 1 is a view of the preferred apparatus shown partly in elevation and partly in cross-section; and Fig. 2 is a view in elevation of a modification of a portion of the apparatus shown in Fig. 1.

Gas containing carbon dioxide is passed through pipe 1 into the bottom of a cooler 2. Water supplied through pipe 3 at the top of the cooler 2 is sprayed downwardly countercurrent to the gas. The water and other matter entrained therein pass out of the cooler 2 by means of pipe 4. The resulting gases pass out at the top of cooler 2 through pipe 5 and into the bottom of a tower 6. The gases pass upwardly through the tower 6 through a downward spray of dilute sodium carbonate solution whereby objectionable solid matter and gases such as sulphur dioxide are removed.

The dilute sodium carbonate solution is circulated by means of a pump 7 through a pipe 8 and into the top of the tower 6.

After the above preliminary treatment, the residual gases containing carbon dioxide are passed through a pipe 9 and through a series of compression pumps and coolers. The gases pass successively through the first stage compressor 10, cooler 11, the second stage compressor 12, the cooler 13, the third stage compressor 14 and the cooler 15 and thence through a heat exchanger 16. From the heat exchanger 16, the compressed and cooled gases pass through pipe 17 having a valve 18, and through nozzle 19 whereupon the gases are expanded to produce solid carbon dioxide, in a combination filtering chamber and extrusion device.

The combination filter chamber and extrusion device comprises a snow chamber in which the solid carbon dioxide is separated from residual gases, and, means for compressing the carbon dioxide particles into solid blocks. The snow chamber has a perforated inner wall 20 and two outer solid walls 21 and 22 spaced apart to form two annular chambers. The extrusion device is placed at the bottom of the tower and extends horizontally therefrom and has a solid tubular wall 23 which gradually tapers to an opening 24 of relatively small diameter. The walls 21 and 22 are continued so as to form two annular chambers around the extrusion device. Within the extrusion device is a tapering screw conveyor 25 which may be turned by any suitable means.

In the operation of the combination filter chamber and extrusion device, the carbon dioxide snow settles to the bottom of the snow chamber surrounded by the perforated wall 20. The residual gases pass through the perforations and the scraping means comprising a revolving shaft 26 upon which are mounted scrapers 27, prevent the openings in the wall 20 from becoming clogged by the carbon dioxide snow.

The carbon dioxide snow is carried away from the bottom of the snow chamber by means of the screw conveyor 25 which compresses it toward the small end of the tube 23 and forces it out in solid form through the opening 24 where blocks of carbon dioxide of any desired size may be cut off.

The aforesaid residual gases separated from the carbon dioxide snow pass downwardly between the walls 20 and 21 and thence horizontally around the wall 23 of the extrusion device and aid in keeping the apparatus cold. As an added precaution the annular chamber formed by walls 21 and 22 is also continued around the extrusion device and serves as an insulating means.

The residual gases are passed through pipe 28 into the heat exchanger 16 around the tubes through which the carbon-dioxide-containing gases from the cooler 15 are passed and out through pipe 29.

The series of apparatus shown in Fig. 2 may be substituted for the apparatus units 10 to 15, inclusive, shown in Fig. 1. In Fig. 2 a bubble tank 30 is placed after the first stage compressor 31 and cooler 32 and before the second stage compressor 33 which is followed by a cooler 34, a third stage compressor 35 and a cooler 36.

Gases from cooler 36 may then be passed through a freezing unit for eliminating water. Two such freezing units are shown, namely, 37 and 38 which may be used alternately so that one may be in use while water ice is being removed from the other.

From a freezing unit, the gases are passed through any suitable pre-cooler 39 from which they are passed through a heat exchanger such as 16 and a filtering and extrusion means as shown in Fig. 1. The freezing units 37 and 38 may be maintained at a sufficiently low temperature by means of the gases coming from the heat exchanger 16 through pipe 29.

The bubble tank 30 may contain potassium permanganate solution for the removal of organic matter or other obnoxious ingredients in the gas. Two such units may be used alternately so that one may be placed in operation while the other is being cleaned. In place of a bubble tank containing potassium permanganate solution, a tower containing charcoal or activated charcoal may be employed.

The gas before entering the heat exchanger 16 may be compressed to about from 300 atmospheres to 500 atmospheres or it may be compressed to a somewhat lower pressure of, for instance, 100 atmospheres and cooled down by the use of a carbon dioxide refrigerating machine. Under these conditions, a part of the carbon dioxide tends to liquefy. Nevertheless, the mixture of gases and liquid may be expanded through a nozzle to form carbon dioxide snow.

At minus 78° C. the vapor pressure of solid carbon dioxide is 760 millimeters and at minus 123° C. the vapor pressure is 4 millimeters. Upon expanding the dilute carbon dioxide gas at this latter temperature, substantially all the carbon dioxide separates from the nitrogen and other gases in the form of a solid. A practical operating temperature is about minus 100° C. or minus 105° C.

The advantages of the present process are: (1) the production of substantially 100% pure carbon dioxide and the manufacture of solid carbon dioxide are combined in one simple operation, (2) no recompression of carbon dioxide is required, and (3) the carbon dioxide ice is produced at a somewhat lower temperature than that used in present processes, which reduces the losses in handling.

I claim as my invention:

Apparatus comprising a chamber having a perforated wall, a tube extending from the bottom of the said chamber; a plurality of spaced solid walls encasing the sides of the said chamber and of the said tube and forming continuous annular chambers around both; inlet means at the top of the said first named chamber for compressed, cooled gas containing carbon dioxide; scrapers for removing carbon dioxide snow from the said perforated wall; gas outlet means for withdrawing gas through the perforated wall and the innermost annular chamber; and a screw conveyor for passing the carbon dioxide snow from the bottom of the said first named chamber through the said tube.

MARK SHOELD.